United States Patent [19]

Sheppard

[11] Patent Number: 5,069,487
[45] Date of Patent: Dec. 3, 1991

[54] FLEXIBLE CONNECTOR

[75] Inventor: Michael W. Sheppard, Batavia, Ill.

[73] Assignee: Flexonics Inc., Bartlett, Ill.

[21] Appl. No.: 476,838

[22] Filed: Feb. 8, 1990

[51] Int. Cl.$^5$ ............................................. F16L 27/00
[52] U.S. Cl. .................................. 285/226; 285/166;
285/138; 285/184; 285/261; 285/424;
285/382.2; 285/382.5
[58] Field of Search ................ 285/226, 184, 138, 424,
285/382.2, 382.5, 45, 166, 261

[56] References Cited

U.S. PATENT DOCUMENTS

| | | | |
|---|---|---|---|
| 2,451,252 | 10/1948 | Stoeckly | 285/90 |
| 2,484,087 | 10/1949 | Hauf | 285/382.2 X |
| 2,616,728 | 11/1952 | Pitt | 285/11 |
| 2,712,456 | 7/1955 | McCreery | 285/90 |
| 3,029,094 | 4/1962 | Parlasca et al. | 285/114 |
| 3,420,553 | 1/1969 | Poxon et al. | 285/49 |
| 3,627,354 | 12/1971 | Toepper | 285/55 |
| 3,770,303 | 11/1973 | Hallett | 285/226 X |
| 3,820,829 | 6/1974 | Hasselbacher et al. | 285/226 |
| 3,869,151 | 3/1975 | Fletcher et al. | 285/226 X |
| 3,915,482 | 10/1975 | Fletcher et al. | 286/226 |
| 4,251,094 | 2/1981 | Pinto | 285/424 X |
| 4,283,078 | 8/1981 | Ross et al. | 285/45 |
| 4,408,785 | 10/1983 | Legros et al. | 285/49 |
| 4,445,332 | 5/1984 | Thies et al. | 60/455 |
| 4,526,409 | 7/1985 | Schaefer | 285/114 |
| 4,553,775 | 11/1985 | Halling | 285/55 |
| 4,659,117 | 4/1987 | Holzhausen et al. | 285/49 |

FOREIGN PATENT DOCUMENTS 1244446 9/1960 France .

OTHER PUBLICATIONS

Flexonics Inc. Technical Drawing No. 311-300-9001 released for production 2/4/80.

Primary Examiner—Randolph A. Reese
Assistant Examiner—Tim Aberle
Attorney, Agent, or Firm—Dick and Harris

[57] ABSTRACT

A flexible connector is provided for coupling a source and discharge outlet for fluid transfer. The connector has a tubular metal bellows, an inner tubular metal liner, couplings at each end of the bellows having articulated joints between the inner liner and the couplings, such that the liner provides isolation between gases flowing through the connector and the bellows, and protective structure encompassing the bellows.

21 Claims, 2 Drawing Sheets

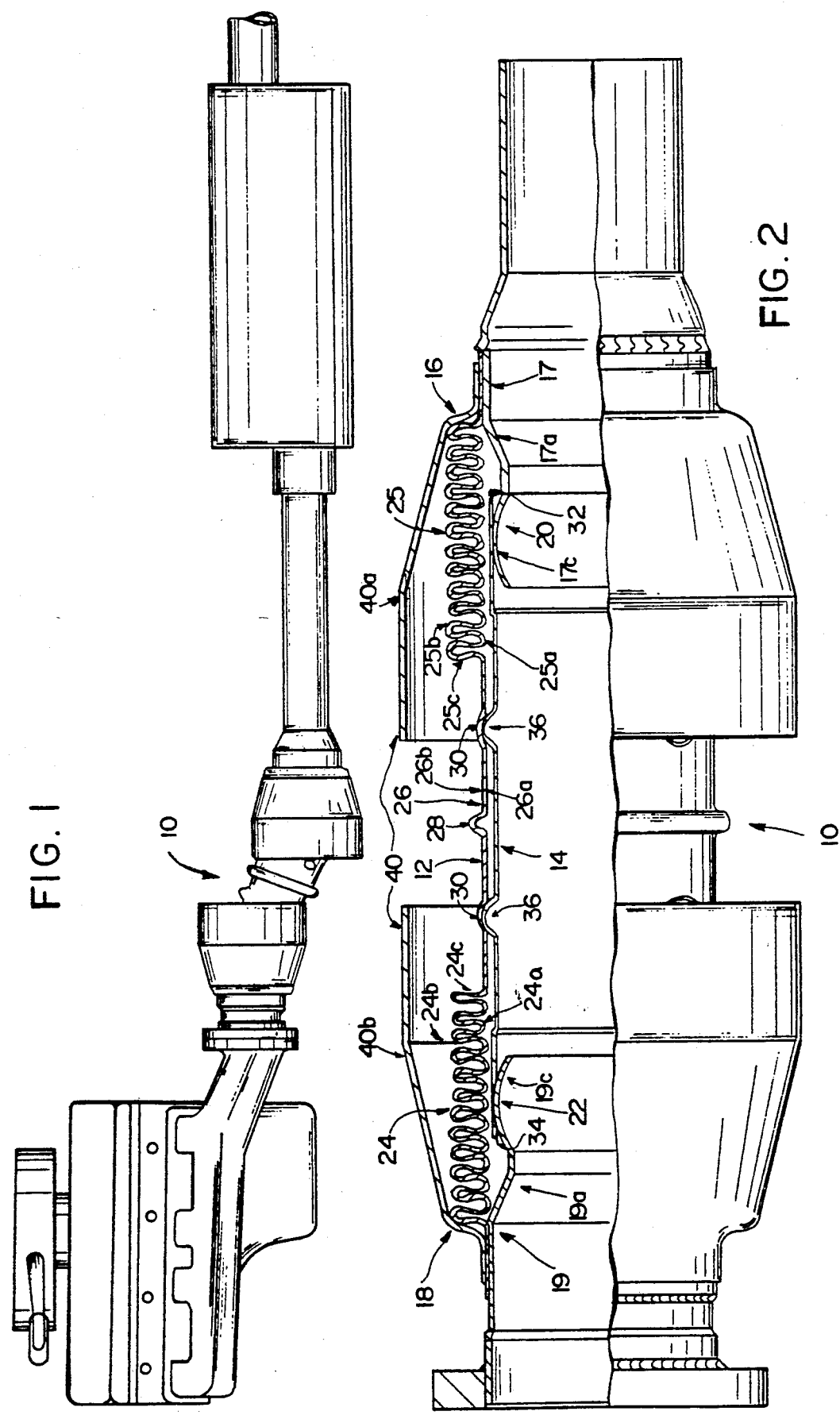

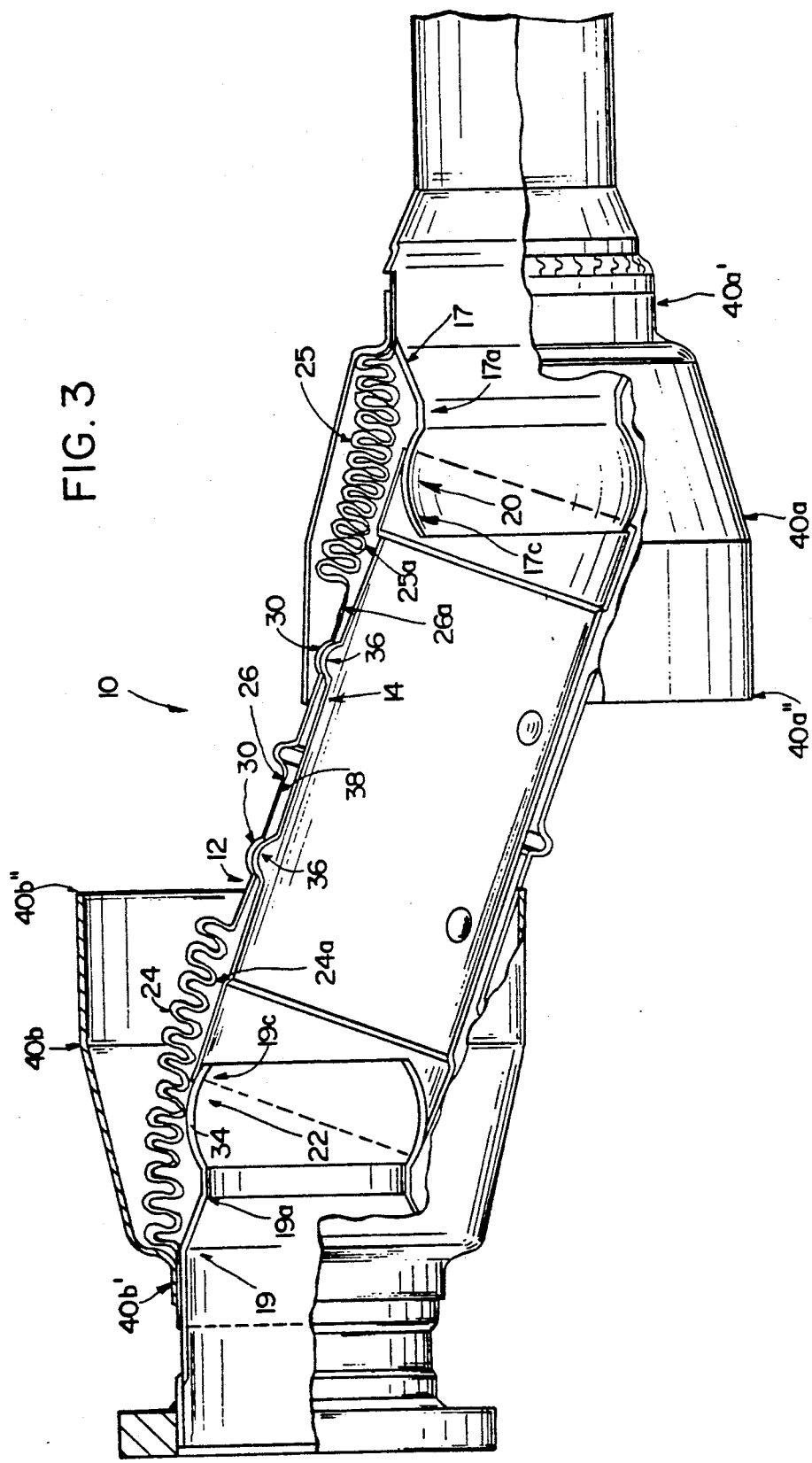

FLEXIBLE CONNECTOR

FIELD OF THE INVENTION

The invention relates to a flexible connector with a rigid inner member and having articulated joints for accommodating a variety of operating configurations.

BACKGROUND OF THE INVENTION

In a flexible connector, such as used in a combustion engine exhaust system, a flexible tube is provided with compliant reinforcement means. In a typical construction, an elongate corrugated member is enveloped with a sleeve of braided strands for protecting the corrugations and has an inner liner of a braided material or of soft resilient material for dampening sound waves as shown in Toepper U.S. Pat. No. 3,627,354. This approach adds weight, cost, and complexity to the system.

SUMMARY OF THE INVENTION

In accordance with the invention, a flexible connector couples a source and discharge outlet for fluid transfer. More specifically, the connector has a tubular metal bellows, an inner tubular metal liner, and couplings at each end of the bellows having articulated joints between the inner liner and the couplings, such that the liner isolates the gases flowing through the connector from the bellows.

Another feature of the invention, as when utilized in an automobile exhaust system, is that the bellows and inner liner are spaced such that an annular cavity is defined between the two members which serves to provide thermal isolation between the bellows and the hot exhaust gases flowing through the liner. The impermeability of the liner in conjunction with the layer of thermal insulation protects the bellows from exposure to damaging temperatures so that the bellows may be composed of a less robust and less expensive material.

Yet another feature of the invention is that the tubular liner reduces the flow-resisting friction along the interior of the connector such that the backpressure of the flow is reduced and the fluid source may operate at higher efficiency.

Further features and advantages of the invention will readily be apparent from the following specification and from the drawings.

BRIEF DESCRIPTION OF THE DRAWINGS

FIG. 1 is a diagrammatic illustration of the flexible connector in the exhaust system of an internal combustion engine;

FIG. 2 is a longitudinal section through the connector; and

FIG. 3 is a longitudinal section showing the connector displaced as shown in FIG. 1.

DETAILED DESCRIPTION OF THE DRAWINGS

While this invention is susceptible of embodiment in many different forms, there is shown in the drawings and will be described herein in detail, a specific embodiment, with the understanding that the present disclosure is to be considered as an exemplification of the principles of the invention and is not intended to limit the invention to the embodiment illustrated.

A flexible connector is commonly used in an automobile exhaust system and shown in FIG. 1. One end of the connector is attached to the engine and the other end is attached to an exhaust discharge assembly downstream of the engine. Because the underbody configuration of different automobiles is varied, and further due to vibratory engine displacement, the connector must be sufficiently flexible to accommodate a plethora of operating configurations.

A connector illustrating the invention is shown in FIG. 2. Flexible connector 10 has a tubular metal bellows 12 which surrounds an inner liner 14. A coupling 17 is provided at an end 16 of the bellows, and a coupling 19 is provided at an opposite end 18 of the bellows. Articulated joints 20 and 22 flexibly connect the liner 14 with the couplings 17 and 19, respectively. Protective structure 40 encompasses the bellows.

The bellows 12 comprises an elongate metal tube having corrugated end portions 24 and 25 longitudinally spaced by a non-corrugated central portion 26. The corrugated portion 24 has corrugations 24c for defining an inner corrugated surface 24a and an outer corrugated surface 24b. The corrugated portion 25 has corrugations 25c for defining an inner corrugated surface 25a and an outer corrugated surface 25b. The central portion 26 has an outer surface 26b and an inner surface 26a. A circumferential strengthening shoulder 28 and a plurality of dimples 30 are disposed on the inner surface 26a of the central portion.

The liner 14 comprises an elongate metal tube having end surfaces 32 and 34. The surface of the liner contains a plurality of dimples 36 received in the dimples 30 of the enveloping bellows 12 such that relative axial displacement of the liner 14 and bellows 12 is prohibited by the interlocking of the dimples.

Couplings 17 and 19 have inwardly extending tubular elements 17a and 19a, respectively, with circular cross sections. Coupling 17 has a surface 17c of arcuate profile inwardly adjacent the tubular element 17a, and coupling 19 has a surface 19c of arcuate profile inwardly adjacent the element 19a, with the arcuate surfaces 17c and 19c being typically of spherical section.

Articulated joint 20 is defined by the mating of end surface 32 of the liner 14 with arcuate surface 17c of the coupling 17. Articulated joint 22 is defined by the mating of end surface 34 of the liner 14 with arcuate surface 19c of the coupling 19. The articulated joints 20 and 22 provide a flexible junction of the rigid liner 14 with the couplings 17 and 19, respectively.

A protective structure 40 is secured around the bellows 12. The protective structure 40 has two flared shroud members 40a and 40b spaced along the connector such that the narrow end of shroud 40a is fixed to the connector near coupling 17 and the narrow end of shroud 40b is fixed to the connector near coupling 19. The shrouds extend axially inward towards the central portion 26 of the bellows and protectively enclose the corrugated portions 24 and 25, respectively.

A detailed application of the invention is shown in FIG. 3. Due to the numerous operating configurations of the connector 10, it is not always possible to operate the connector in an orientation with the tubular element 17a of the coupling 17 coaxial with the tubular element 19a of the coupling 19. In this situation, rotational compliance of the connector is provided by the corrugated sections 24 and 25 of the bellows 12, and by the articulated geometry of the joints 20 and 22. As the axes of the couplings 17 and 19 are relatively disoriented, the corrugated sections of the bellows flexurally accommodate the deformation. Although the liner 14 is rigid, the end surfaces 32 and 34 of the liner are flexibly coupled with the engageable surfaces 17c and 19c of the couplings 17 and 19, respectively, for smooth coaction such that the liner can freely adapt to the deformed orientation of the bellows. Because of the interlocked dimples 30, on the central portion 26 of the bellows 12, and 36, on the surface of the liner 14, the liner is prevented from shifting axially relative to the bellows. In this way, the rigid liner comprises a low cost, flexible shield for preventing flowing gases from impinging with the corrugated inner surfaces of the bellows, and thereby reduces the noise attributed to vibratory excitement of the corrugations.

In an application where hot gases flow through the connector, it is desirable to isolate the compliant material of the bellows from the high temperatures to which the interior of the liner is subjected. When the couplings 17 and 19 are joined with the bellows 12 and liner 14 as described above, an interior annular cavity 38 is established between the liner and the inner surfaces 24a, 25a, 26a of the bellows. The annular cavity 38 defines a layer of such thermal isolation between the bellows and the liner whereby exposure of the bellows to damaging temperatures is reduced. Because the temperatures to which the bellows is exposed are reduced, it is not necessary for the bellows material to be capable of withstanding severe heat, and it is possible to construct the bellows of a less expensive material.

In an operating environment in which external shielding of the connector is desired, the protective structure 40 prevents damage to the exterior of the bellows, and further eliminates the risk of serious injury or fire through inadvertent contact with the heated bellows. Structure 40 comprises two flared shrouds 40a, 40b which are mounted on couplings 17, 19 at outer ends 40a', 40b' respectively. The shrouds extend around the corrugated end portions 25 and 24 of the bellows and have space apart inner ends 40a'', 40b''. The inner ends 40a'', 40b'' encircle the central portion 26 of the bellows and have a cross sectional diameter greater than the cross sectional diameter of the outer ends 40a', 40b'. The flared geometry of the shrouds 40a and 40b prevent interference between the bellows and the shrouds when the connector undergoes deformation. Because the two shrouds do not completely encapsulate the connector, the protective structure 40 allows the circulation of cooling air around the bellows.

I claim:

1. A flexible connector for accommodating a variety of different conduit configurations, and for absorbing noise and vibration through a freely flexible, fully orientatable construction, said flexible connector comprising:
   tubular bellows means having two oppositely disposed ends,
   said tubular bellows means having a bellows portion thereof arranged substantially adjacent each of said two ends respectively;
   an input coupling member positioned at one end of said tubular bellows means;
   an output coupling member positioned at the other end of said tubular bellows means;
   tubular liner means having opposed ends and operably arranged between said input coupling member and said output coupling member to enable fluid communication therebetween, said tubular liner means arranged inside of and substantially coaxially with said tubular bellows means; and
   two articulated joints, each of which is located at a respective end of said tubular liner means, one of said articulated joint means operably connecting said respective end of said tubular liner means with said input coupling member, and the other of said articulated joint means operably connecting the other respective end of said tubular liner means with said output coupling member,
   each of said articulated joint means being operably disposed to permit substantially unrestricted angular movement of said coupling members relative to the longitudinal axis of said tubular liner means as well as to each other to, in turn, enable the longitudinal axis of said input coupling member to alternatively be positioned either intersecting or nonintersecting to the longitudinal axis of said output coupling.

2. The flexible connector of claim 1 wherein each of said articulated joint means comprises:
   two tubular metal elements of circular cross section and having opposite mating surfaces, one mating surface disposed on an inner surface of said tubular liner means, and the other mating surface disposed on an outer surface of an end of a respective one of said input and output coupling members, having an spherical element disposed thereon to accommodate movement between the coupling member and the liner.

3. The flexible connector of claim 1 further comprising means restricting the relative axial displacement of said tubular bellows means and said liner.

4. The flexible connector of claim 1 wherein said ends of said bellows are separated by a non-corrugated central portion.

5. The flexible connector of claim 1 in which at least one of said articulated joint means is further operably disposed to permit limited axial movement of the entirety of at least one of said coupling members relative to said tubular liner means, as well as relative to the other coupling member.

6. The flexible connector of claim 1 further comprising:
   means for thermally isolating said tubular bellows means for fluid passing through said flexible connector.

7. The flexible connector of claim 2 wherein said spherical elements on said input and output coupling members comprises a portions of said input and output coupling members having convex spherical outwardly projecting surfaces for pivotably contacting said inner surface of said tubular liner means.

8. The flexible connector of claim 3 wherein said means restricting the relative axial displacement of said bellows and said liner comprises at least one pair of interlocking dimples disposed on the tubular means and the liner.

9. The flexible connector of claim 8 wherein said at least one pair of interlocking dimples further comprises three pairs of interlocking dimples symmetrically disposed in circumferentially spaced relation about the tubular bellows means and the liner.

10. The flexible connector of claim 9 wherein a plurality of said three pairs of interlocking dimples are disposed in axially spaced relation along the tubular bellows means and the liner.

11. The flexible connector of claim 4 further comprising means on said tubular bellows means for stiffening said central portion.

12. The flexible connector of claim 11 wherein said bellows stiffening means comprises a circumferential rib on said central portion.

13. The flexible connector of claim 4 further comprising bellows shielding means including two longitudinally spaced shroud elements which extend inwardly from points adjacent said ends of the tubular bellows means toward said central portion.

14. The flexible connector of claim 13 wherein each of said shroud elements has an outer end and an inner end, and is flared with an increasing cross-sectional diameter along its length from said outer end to said inner end.

15. The flexible connector of claim 14 wherein the inner ends of said flared shroud elements encircle said non-corrugated central portion and the outer ends of said flared shroud elements engage said coupling members.

16. The flexible connector of claim 6 wherein said means for thermally isolating said tubular bellows means comprises:
an annular air gap extending circumferentially around said tubular liner means, between said tubular liner means and said tubular bellows means and extending substantially uninterrupted axially along said flexible coupler apparatus from said input coupling member to said output coupling member.

17. A flexible system connector for directing exhaust gases from an internal combustion engine to a discharge means such that the relative displacements of said engine and said discharge means induced by the vibratory forces generated by the engine are accommodated by said flexible exhaust system connector, said flexible exhaust system connector further accommodating a variety of different exhaust system configurations through a freely flexible, fully orientatable construction, said flexible exhaust system connector comprising:
tubular bellows means having oppositely disposed end portions, said end portions separated by a central portion, with said end portions having axially spaced corrugations;
tubular liner means having opposed ends and operably arranged within and substantially coaxially with said tubular bellows means and extending to said corrugated end portions;
coupling members operably disposed adjacent said corrugated end portions of said tubular bellows means,
said tubular liner means, said tubular bellows means, and said coupling members defining an annular cavity therebetween;
means restricting the relative axial displacement of said tubular bellows means and said tubular liner means; and
two articulated joints, each of which is located at a respective end of said tubular liner means,
one of said articulated joint means operably connecting said respective end of said tubular liner means with one of said coupling members, and the other of said articulated joint means operably connected the other respective end of said tubular liner means with the other of said coupling members,
each of said articulated joint means being operably disposed to permit substantially unrestricted angular movement of said coupling members relative to the longitudinal axis of said tubular liner means as well as to each other to, in turn, enable the longitudinal axis of one coupling member to alternatively be positioned either intersecting or non-intersecting to the longitudinal axis of the other coupling member.

18. The flexible exhaust system connector of claim 17 wherein said annular cavity thermally isolates said bellows from exhaust gas flowing through said liner.

19. The flexible exhaust system connector of claim 14 in which at least one of said articulated joint means is further operably disposed to permit limited axial movement of the entirety of at least one of said coupling members relative to said tubular liner means, as well as relative to the other coupling member.

20. A flexible automotive exhaust system connector for accommodating a variety of different automotive exhaust system configurations and for absorbing noise and vibration through a freely flexible, fully orientatable construction, said flexible automotive exhaust system connector comprising:
tubular bellows means having oppositely disposed end portions, said end portions separated by a central portion, with said end portions having axially spaced corrugations;
tubular liner means having opposed ends and operably disposed within said substantially coaxially with said tubular bellows means and extending substantially coextensively with said tubular bellows means;
coupling members operably disposed adjacent said corrugations of said tubular bellows means, such that said tubular liner means and said coupling members provide improved audio isolation between impinging automotive exhaust gases flowing through said tubular liner means and the exterior of said connector;
means restricting the relative axial displacement of said tubular bellows means and said tubular liner means; and
two articulated joints, each of which is located at a respective end of said tubular liner means,
one of said articulated joint means operably connecting said respective end of said tubular liner means with one of said coupling members, and the other of said articulated joint means operably connecting the other respective end of said tubular liner means with the other of said coupling members, each of said articulated joint means being operably disposed to permit substantially unrestricted angular movement of said coupling members relative to the longitudinal axis of said tubular liner means as well as to each other to, in turn, enable the longitudinal axis of one coupling member to alternatively be positioned either intersecting or non-intersecting to the longitudinal axis of the other coupling member.

21. The flexible automotive exhaust system connector of claim 16 in which at least one of articulated joint means is further operably disposed to permit limited axial movement of the entirety of at least one of said coupling members relative to said tubular liner means, as well as relative to the other coupling member.

* * * * *

UNITED STATES PATENT AND TRADEMARK OFFICE
CERTIFICATE OF CORRECTION

PATENT NO. : 5,069,487

DATED : December 3, 1991

INVENTOR(S) : Michael W. Sheppard

It is certified that error appears in the above-identified patent and that said Letters Patent is hereby corrected as shown below:

| | |
|---|---|
| Col. 2, line 38 | "the element 19a," should read instead -- the tubular element 19a, -- |
| Col. 3, line 53 | "posed ends," should read instead -- posed ends; -- |
| Col. 4, line 43 | "means for" should read instead -- means from -- |
| Col. 4, line 55 | "tubular means" should read instead -- tubular bellows means -- |
| Col. 5, line 28 | "A flexible system" should read instead -- A flexible exhaust system -- |
| Col. 5, line 30 | "means such" should read instead -- means, such -- |
| Col. 5, line 60 | "operably connected" should read instead -- operably connecting -- |

UNITED STATES PATENT AND TRADEMARK OFFICE
CERTIFICATE OF CORRECTION

PATENT NO. : 5,069,487

DATED : December 3, 1991

INVENTOR(S) : Michael W. Sheppard

It is certified that error appears in the above-identified patent and that said Letters Patent is hereby corrected as shown below:

| | |
|---|---|
| Col. 6, line 11 | "of claim 14" should read instead -- of claim 17 -- |
| Col. 6, line 28 | "disposed within said" should read instead -- disposed within and -- |
| Col. 6, line 59 | "of claim 16" should read instead -- of claim 20 -- |
| Col. 6, line 59 | "of articulated" should read instead -- of said articulated -- |

Signed and Sealed this

Third Day of August, 1993

Attest:

MICHAEL K. KIRK

Attesting Officer

Acting Commissioner of Patents and Trademarks